(12) United States Patent
Shatkin

(10) Patent No.: US 11,730,565 B1
(45) Date of Patent: Aug. 22, 2023

(54) SLEEVE FOR INSTALLING A CROWN ON A MINIATURE DENTAL IMPLANT

(71) Applicant: Todd E. Shatkin, Williamsville, NY (US)

(72) Inventor: Todd E. Shatkin, Williamsville, NY (US)

( * ) Notice: Subject to any disclaimer, the term of this patent is extended or adjusted under 35 U.S.C. 154(b) by 88 days.

(21) Appl. No.: 16/927,038

(22) Filed: Jul. 13, 2020

Related U.S. Application Data

(60) Provisional application No. 62/873,513, filed on Jul. 12, 2019.

(51) Int. Cl.
*A61C 5/35* (2017.01)
*A61C 8/00* (2006.01)

(52) U.S. Cl.
CPC .............. *A61C 5/35* (2017.02); *A61C 8/0071* (2013.01); *A61C 8/0074* (2013.01)

(58) Field of Classification Search
CPC ........ A61C 5/35; A61C 8/0074; A61C 8/0071
See application file for complete search history.

(56) References Cited

U.S. PATENT DOCUMENTS

| | | | | |
|---|---|---|---|---|
| 5,447,435 A * | 9/1995 | Brodbeck | .............. | A61C 8/005 433/172 |
| 6,168,435 B1 * | 1/2001 | Beaty | .................. | A61C 8/0069 433/172 |
| 7,670,142 B2 * | 3/2010 | Giorno | .................... | A61C 8/005 433/213 |
| 9,883,926 B2 * | 2/2018 | Haralampopoulos | ....................... | A61C 8/0048 |
| 2003/0068599 A1 * | 4/2003 | Balfour | ................ | A61C 8/0022 433/173 |
| 2004/0018471 A1 * | 1/2004 | Giorno | ................ | A61C 8/0089 433/221 |
| 2004/0063069 A1 * | 4/2004 | Lombardi | .............. | A61C 8/005 433/173 |
| 2007/0160955 A1 * | 7/2007 | Han | ...................... | A61C 8/005 433/173 |
| 2007/0190490 A1 * | 8/2007 | Giorno | ............... | A61C 13/2656 433/172 |
| 2010/0112520 A1 * | 5/2010 | Worthington | ........ | A61C 8/0075 433/169 |
| 2010/0196852 A1 * | 8/2010 | Baruc | .................... | A61C 8/005 433/173 |
| 2014/0011160 A1 * | 1/2014 | Jorneus | ................ | A61C 8/0068 433/173 |
| 2014/0272791 A1 * | 9/2014 | Sanchez | .............. | A61C 8/0068 433/173 |

* cited by examiner

*Primary Examiner* — Ralph A Lewis
(74) *Attorney, Agent, or Firm* — David L. Principe; Phillips Lytle LLP

(57) ABSTRACT

A sleeve for installing a crown on a miniature dental implant. The sleeve has a bore for receiving an abutment on a miniature dental implant. The sleeve has a shape configured and arranged for being received in the bore of a dental crown to prevent dental cement from flowing to the gum line.

7 Claims, 5 Drawing Sheets

US 11,730,565 B1

SLEEVE FOR INSTALLING A CROWN ON A MINIATURE DENTAL IMPLANT

CROSS-REFERENCE TO RELATED APPLICATION

The present application claims priority benefit of U.S. Provisional Patent Application No. 62/873,513 entitled "Sleeve for Installing a Crown on a Miniature Dental Implant" dated Jul. 12, 2019, which is incorporated herein by reference.

TECHNICAL FIELD

The present invention relates generally to the field of oral prostheses, and more particularly to the field of dental implants and crowns.

BACKGROUND ART

Dental implants are well known devices used in dental surgery to restore lost, broken or decayed teeth. The essential function of a dental implant is to act as an anchor to hold in place a prosthetic device such as a fixed or removable denture appliance or single prosthetic tooth. Implants attain stability by being embedded in the patient's jawbone, thereby giving a firm foundation to the prosthetic device that protrudes above a patient's gum line. There are drawbacks to cement retained implant prosthetics due to the fact that cement can go down the tissue and cause problems such as periimplantitis.

SUMMARY OF THE INVENTION

With parenthetical reference to the corresponding parts, portions or surfaces of the disclosed embodiment, merely for the purposes of illustration and not by way of limitation, the present invention meets the above-described need by providing a dental restoration system that includes a miniature dental implant (11) having a shaft (10) with a first end (19). The first end (19) has a self-tapping thread (13) tapering to a point. The shaft (10) has a second end disposed opposite from the first end. The second end extends to an abutment (12). A sleeve (27) has a first end (36) a second end (42) disposed opposite from the first end (36), The second end (36) has an opening (70) defined therein. The opening (70) is disposed in communication with a bore (24), The bore (24) is configured to receive the abutment (12) on the miniature dental implant (11) by friction fit. The sleeve (27) has a flared outer surface (39) disposed near the second end (42). A crown (21) has a first end and a second end (55). The second end (55) has an opening (54) in communication with a bore (56). The bore (56) is configured to receive the sleeve (27) such that the flared outer surface (39) engages with an inner surface (57) of the crown (21) to prevent a dental cement from flowing out of the bore (56) beyond the flared surface (39).

DESCRIPTION OF THE PREFERRED EMBODIMENTS

Figure 1:
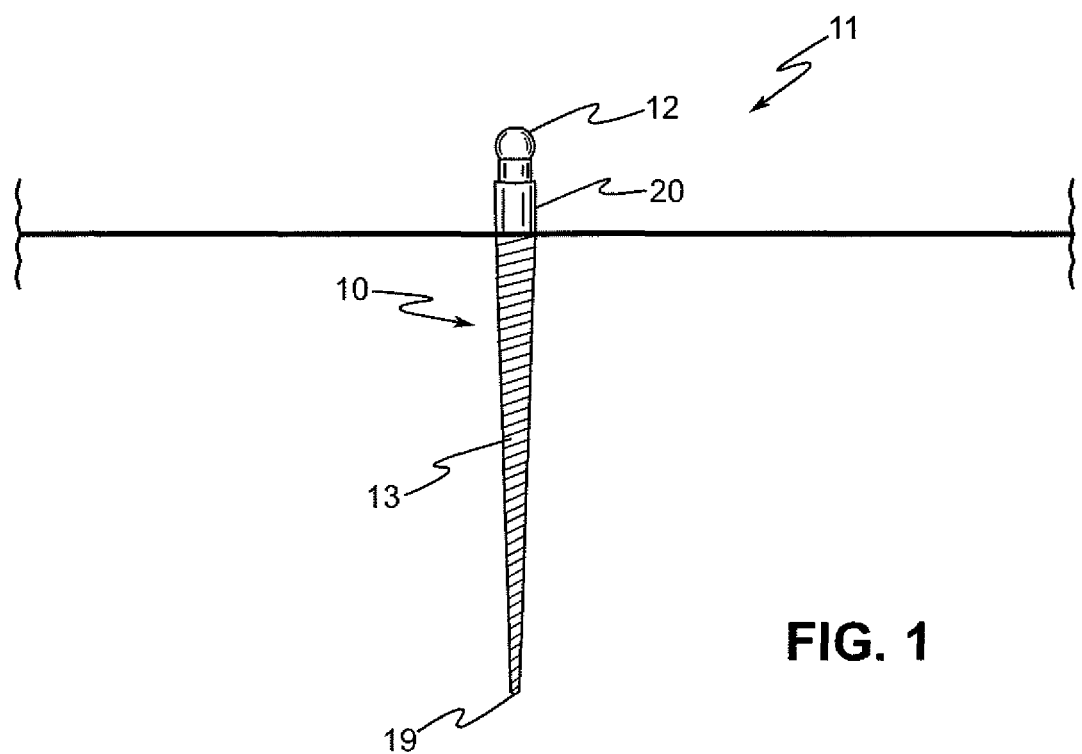
FIG. 1 is a front elevational view of a miniature dental implant of the present invention.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Figure 2:
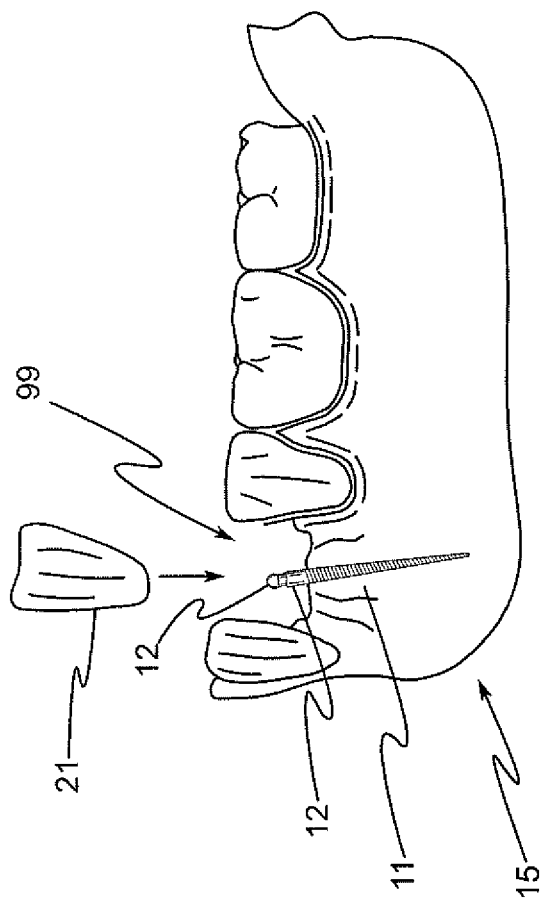
FIG. 2 depicts the attachment of a prosthetic tooth of the present invention to a dental implant.
Figure 3:
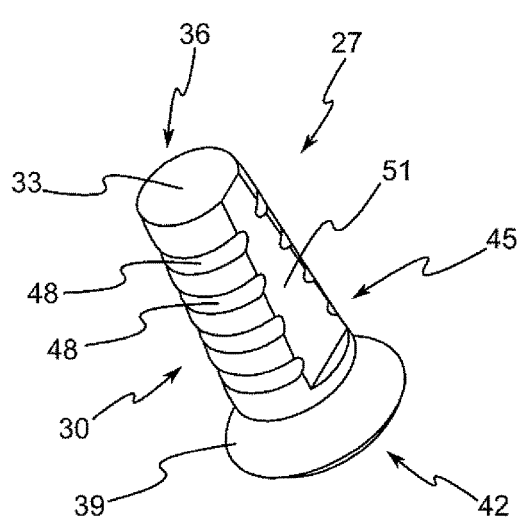
FIG. 3 is a perspective view of the sleeve of the present invention.
Figure 4:
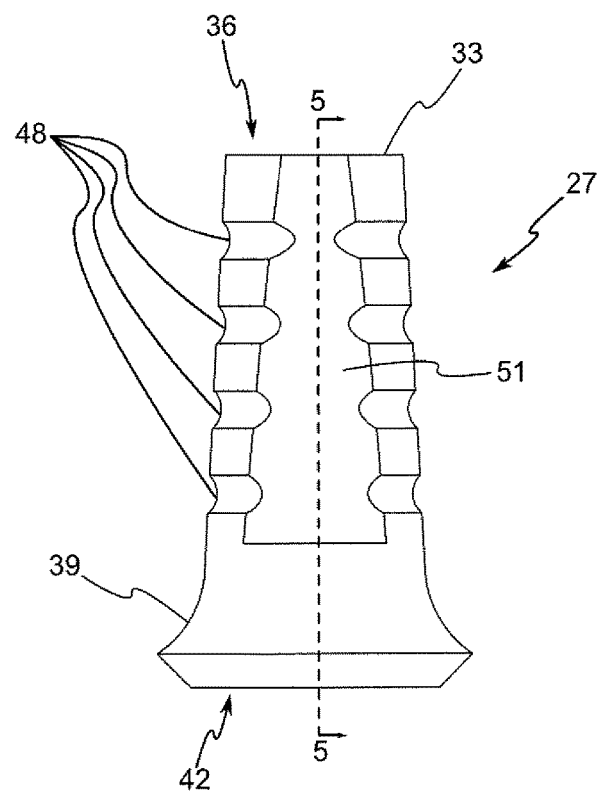
FIG. 4 is a front elevational view of the sleeve shown in FIG. 3.
Figure 5:
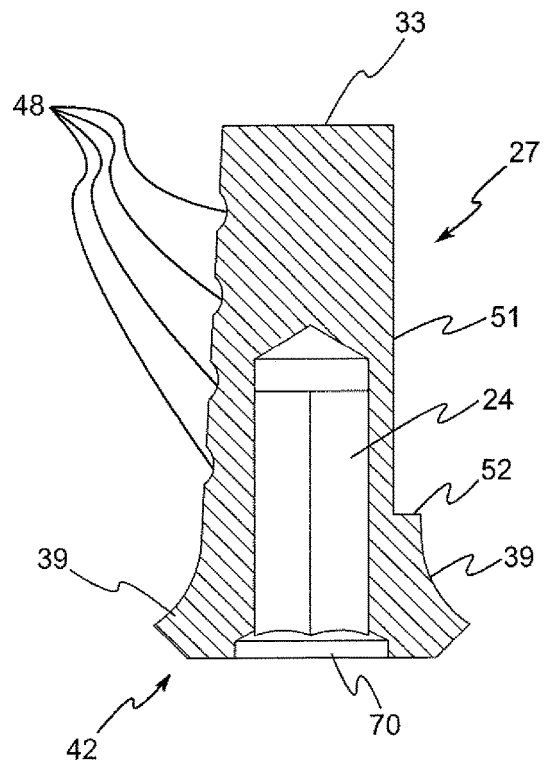
FIG. 5 is sectional view taken along lines 5-5 of FIG. 4.

Referring now to the drawings, and more particularly to FIGS. 1-2 thereof, a miniature dental implant 11 has a shaft 10 ranging in diameter from 1.6 to 2.5 mm. A more preferred diameter is 1.8-2.2 mm depending on the density of the bone material that will support implant 11. Threaded section 13 may extend from tip 19 to carrier section 20. Tip 19 has a point sufficient to enable implant 11 to be self-tapping when it is inserted into lower jawbone 15 (FIG. 2). Carrier section 20 is configured in such a way as to allow instruments such as suitably sized wrenches, ratchets, or similar tools to grab and turn implant 11 in order to screw implant 11 into bone material. Abutment 12 is at the opposite end of implant 11 from tip 19. Abutment 12 is configured to be inserted into sleeve 27 (FIG. 5). Abutment 12 may have any shape including a sphere as shown in FIG. 1. Any shape of abutment 12 should be such as to enable insertion into bore 24 (FIG. 5) of sleeve 27.

The installation of miniature dental implants 11 into the spaces 99 between existing teeth is generally disclosed in U.S. Pat. No. 7,108,511, the entirety of which is incorporated herein by reference.

Turning to FIGS. 3-6, a sleeve 27 may be provided for use in connection with installing the crown 21 onto the miniature dental implant 11. The sleeve 27 may be formed in the shape of a generally conical body 30 having a truncated top surface 33 at a first end 36 and having an outwardly flared surface 39 near a second end 42. The outer surface 45 of the sleeve 27 may be provided with a plurality of grooves 48. The outer surface 45 may also include a flat section 51.

As shown in FIG. 5, the sleeve 27 has an opening 70 at the second end 42. Opening 70 is in communication with a bore 24. Bore 24 is configured and arranged to receive abutment 12 of miniature dental implant 11. The abutment 12 of the miniature dental implant 11 is held in position by a friction fit inside bore 24.

A shoulder 52 may be formed on the outer surface 45 of the sleeve 27 at the end of the flat section 51.

Figure 6:
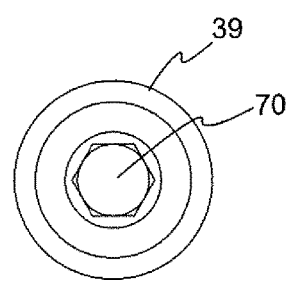
FIG. 6 is bottom plan view of the sleeve of the present invention.

In FIG. 6, a bottom plan view shows opening 70 at the second end 42 of sleeve 27 for receiving the abutment 12 of implant 11. The opening 70 may be hexagonal shaped as shown. Other shapes including square may also be used. In FIG. 6, the spherical abutment 12 is shown inside the opening 70.

Figure 8:
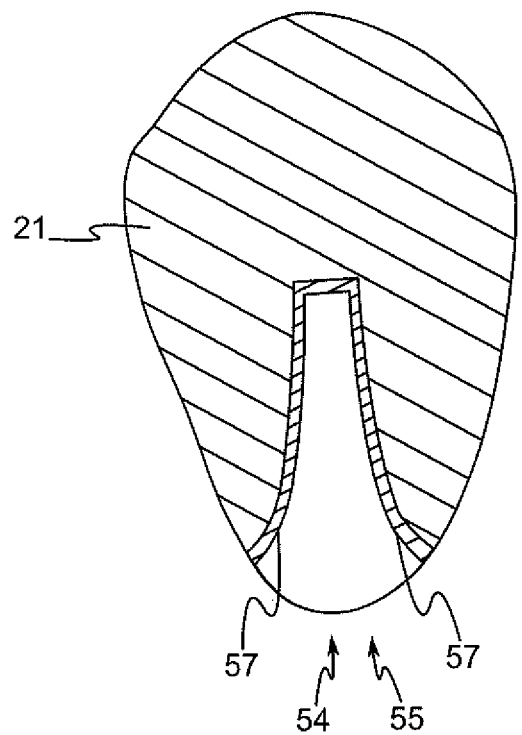
FIG. 8 is a cross section of the incisor shaped crown shown in FIG. 7.
Figure 7:
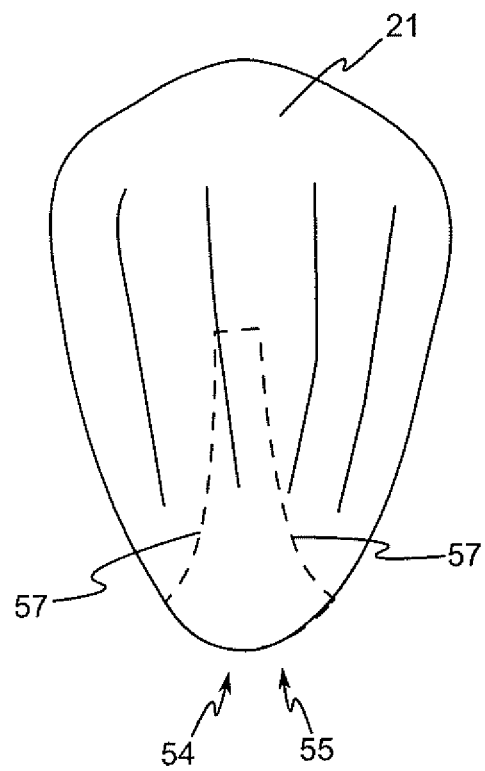
FIG. 7 is a side view of an incisor-shaped crown of the present invention.

Turning to FIGS. 7-8, the crown 21 has an opening 54 at a second end 55 that is configured and arranged to fit onto the sleeve 27. The inner surfaces 57 of the crown 21 are curved to match the flared surface 39 of the sleeve 27. Opening 54 is in communication with a bore 56 which is sized to be larger than the sleeve 27 so that it may contain not only sleeve 27 but also dental cement that securely holds sleeve 27 to crown 21. Although dual cured cements are preferred, other dental cements known to those having ordinary skill in the art may be used. The grooves 48 and flat section 51 provide surface area for bonding between the outer surface 45 of the sleeve 27 and the inner surface 57 of the crown 21. The outwardly flared surface 39 of the sleeve 27 prevents dental cement from reaching the gum line of the patient.

Figure 9:
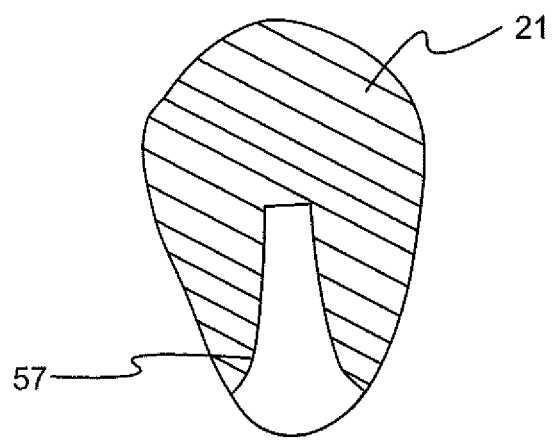
FIG. 9 is an exploded view of the crown, sleeve and miniature dental implant of the present invention.
Figure 9:
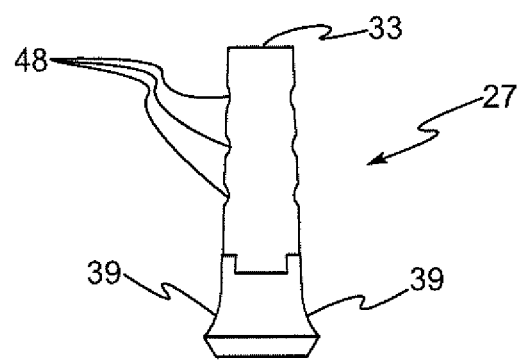
Figure 9:
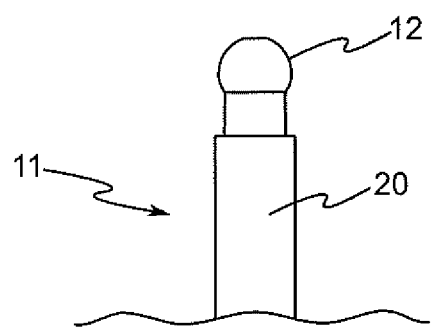

In FIG. 9, the entire system is shown in an exploded view. The sleeve 27 fits onto the miniature dental implant 11. The sleeve 27 is configured and arranged for a frictional fit onto the miniature dental implant 11. The crown 21 may be attached to the sleeve 27 with dental cement that is prevented from reaching the tissue of the patient by flared surface 39.

The present invention contemplates that many changes and modifications may be made. Therefore, while the presently-preferred form of the sleeve for installing a crown on a miniature dental implant has been shown and described, and several modifications and alternatives discussed, persons skilled in this art will readily appreciate that various additional changes and modifications may be made without departing from the spirit of the invention

What is claimed is:

1. A dental restoration system, comprising:
   a miniature dental implant having a shaft with a first end having a self-tapping thread tapering to a point and a second end extending to an abutment;
   a sleeve having a first end a second end disposed opposite from the first end, the second end having an opening defined therein, the opening disposed in communication with a hole, the hole configured to receive the abutment on the miniature dental implant by friction fit, the hole extending from the opening at the second end and terminating inside the sleeve at a closed end positioned in spaced apart relation to the first end, the sleeve having a flared outer surface disposed near the second end, wherein an outer surface of the sleeve has a plurality of grooves formed therein and the outer side surface of the sleeve has a flat section disposed thereon, and the sleeve has a generally conical shaped body that is truncated to form a top surface, the outer surface of the sleeve has a shoulder formed thereon, the shoulder disposed adjacent to the flat section between the flared outer surface and the top surface; and,
   a crown having a first end and a second end, the second end having an opening in communication with a hole, the hole configured to receive the sleeve such that the first end of the sleeve abuts with a closed end of the hole in the crown, and the flared outer surface engages with an inner surface of the crown to prevent a dental cement from flowing out of the bore beyond the flared surface.

2. The dental restoration system of claim 1, wherein the sleeve has a hexagonal opening at the second end.

3. The dental restoration system of claim 1, wherein the sleeve has a square opening at the second end.

4. A sleeve for installing a crown, the crown having an opening in communication with a hole, the crown being installed on a miniature dental implant fixed at the gum line of a patient, the sleeve comprising:
   a body having a first end and a second end, the second end having an opening in communication with a hole, the hole configured to receive the miniature dental implant by a friction fit, the hole extending from the opening at the second end and terminating inside the sleeve at a closed end positioned in spaced apart relation to the first end, the body having a flared outer surface near the second end, wherein the outer surface of the body is configured to be received in the hole of the crown such that the first end of the body abuts with a closed end of the hole in the crown and the flared outer surface prevents a dental cement from flowing out of the hole of the crown to the gum line of the patient, and;
   wherein an outer side surface of the sleeve has a plurality of grooves formed therein and the outer surface of the sleeve has a flat section disposed thereon, and the sleeve has a generally conical shaped body that is truncated to form a top surface, the outer surface of the sleeve has a shoulder formed thereon, the shoulder disposed adjacent to the flat section between the flared outer surface and the top surface.

5. The sleeve of claim 4, wherein the sleeve has a hexagonal opening at the second end.

6. The sleeve of claim 4, wherein the sleeve has a square opening at the second end.

7. A dental restoration system, comprising:
   a miniature dental implant having a shaft with a first end having a self-tapping thread tapering to a point and a second end extending to an abutment;
   a sleeve having a generally conical shaped body with a first end a second end disposed opposite from the first end, the second end having an opening defined therein, the opening disposed in communication with a hole, the hole configured to receive the abutment on the miniature dental implant by friction fit, the hole extending from the opening at the second end and terminating inside the sleeve at a closed end positioned in spaced apart relation to the first end, the sleeve having an outer surface with a flared portion disposed near the second end, the outer surface having a plurality grooves and a flat section defined therein, wherein the sleeve is truncated to form a top surface, the outer surface of the sleeve has a shoulder formed thereon, the shoulder disposed adjacent to the flat section between the flared outer surface and the top surface; and,
   a crown having a first end and a second end, the second end having an opening in communication with a hole, the hole configured to receive the sleeve such that the first end of the body abuts with a closed end of the hole in the crown and the flared outer surface engages with an inner surface of the crown to prevent a dental cement from flowing out of the bore beyond the flared surface.

* * * * *